United States Patent [19]

Wolfshörndl

[11] 4,306,453
[45] Dec. 22, 1981

[54] APPARATUSES FOR MEASURING THE FLOW RATE OF A FLOWING MEDIUM

[76] Inventor: Egon Wolfshörndl, Adjunktsgatan 4 A, S-214 56 Malmö, Sweden

[21] Appl. No.: 138,124

[22] Filed: Apr. 7, 1980

[30] Foreign Application Priority Data

Apr. 11, 1979 [SE] Sweden .............................. 79/00087

[51] Int. Cl.³ ............................................... G01F 1/68
[52] U.S. Cl. ..................................................... 73/204
[58] Field of Search ........................................... 73/204

[56] References Cited

U.S. PATENT DOCUMENTS

| | | | |
|---|---|---|---|
| 3,015,232 | 1/1962 | Schnol | 73/204 |
| 3,290,576 | 12/1966 | Jensen et al. | 73/204 |
| 3,435,676 | 4/1969 | Bruckner et al. | 73/204 |
| 3,938,384 | 2/1976 | Blair | 73/204 |
| 4,041,757 | 8/1977 | Baker et al. | 73/204 |
| 4,043,196 | 8/1977 | Trageser | 73/204 |

*Primary Examiner*—Donald O. Woodiel
*Attorney, Agent, or Firm*—Alexander C. Wilkie, Jr.

[57] ABSTRACT

A flowmeter for gases and liquids utilized a semi-conductor body disposed in the gas or liquid, respectively, one end of the semi-conductor body being heated by means of an electric resistance wire such that at temperature difference, and thereby a voltage difference is realized between the ends of the semi-conductor body. The reduction of the temperature difference, and thereby of the voltage difference, varying with the flow rate is utilized for determining the flow rate. This is effected with the assistance of an amplifier across whose input the semi-conductor body is coupled-in and on whose output a signal representing the flow rate appears.

5 Claims, 2 Drawing Figures

APPARATUSES FOR MEASURING THE FLOW RATE OF A FLOWING MEDIUM

BACKGROUND OF THE INVENTION

1. Field of the Invention

The present invention relates to an apparatus for measuring the flow rate of a flowing medium.

2. Description of the Prior Art

Such apparatuses measure the flow rate of gases or liquids on the basis of a number of various principles. One type of flowmeter utilizes the circumstance that a flowing medium cools a heated body to an extent which, among other things, depends upon the rate of flow of the medium.

One such prior art flowmeter utilizes two thermistors which are both located in the flowing medium but of which only one is heated. By determining the difference between the resistance values of the two thermistors by means of, for example, a bridge connection, it has been possible to measure the flow rate. The disadvantage inherent in this measurement method is that it places very high demands on the mutual adaptation or matching of the thermistors. A very small difference between their resistance-temperature characteristics may easily give rise to errors of substantially the same magnitude as the magnitude of the measurement value itself. The very stringent tolerances involved entail that flowmeters of this type are extremely expensive.

Other prior art flowmeters (see, for example, U.S. Pat. No. 3,030,806) of the above-mentioned type utilize thermocouples, that is to say two conductors consisting of different metals which are soldered together at two points, whereby a thermoelectromotive force is generated if the soldered points are kept at different temperatures. If both of the soldered junctions are placed in the flowing medium and one of them is heated by means of an exterior source of heat, the voltage generated by the thermocouple will be a measurement of the rate of flow of the medium. The disadvantage of this type of flowmeter is the relatively low sensitivity of the thermocouple (the generated voltage is of the order of magnitude of 40 μV/°C. using copper constantan).

SUMMARY

The object of the present invention is to realize a flowmeter which has a higher level of sensitivity than those using thermocouples, but which nevertheless can be produced at low cost.

This object is achieved by a flowmeter which is characterised by a semi-conductor body intended for disposal in the flowing medium and having two electric terminals, means for establishing a temperature gradient in the semi-conductor body between the terminals and a voltage amplifier, the above-mentioned terminals being coupled to the input of the amplifier.

BRIEF DESCRIPTION OF THE ACCOMPANYING DRAWINGS

The invention will be described in greater detail below with reference to the accompanying drawings.

DESCRIPTION OF THE PREFERRED EMBODIMENTS

Figure 1:
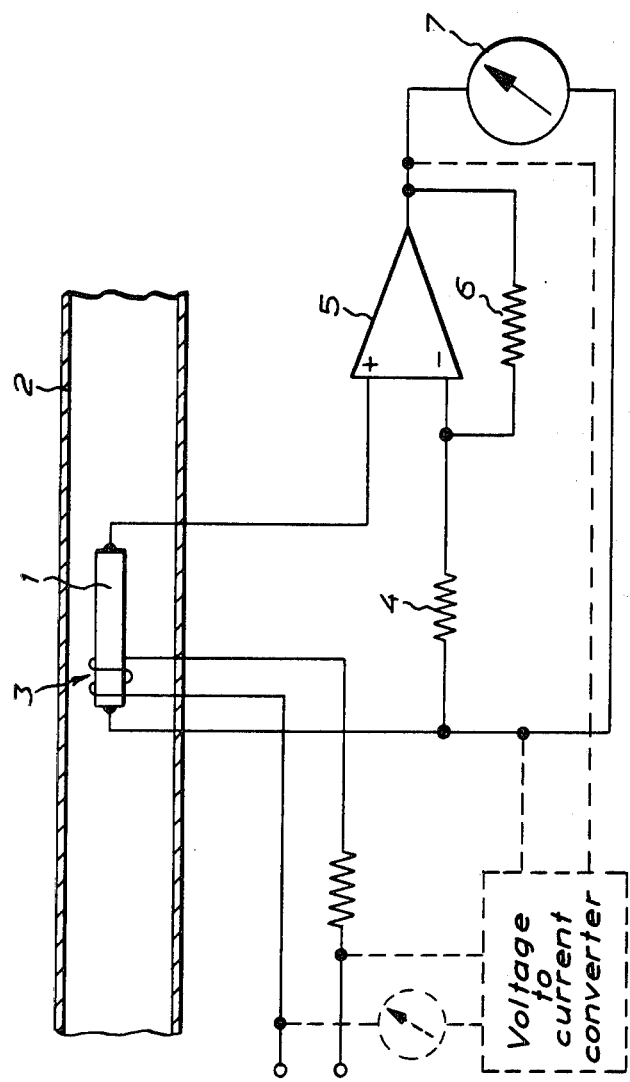
FIG. 1 is a circuit diagram of one embodiment of the invention.

The flowmeter apparatus illustrated in FIG. 1 has a rod-shaped semi-conductor body 1 disposed within a conduit 2 along which passes the medium whose fow rate is to be measured. A heating winding 3 around one end portion of the body 1 is coupled to a current source (not shown). The semi-conductor body, in series with a resistor 4, is coupled to the input side of an operational amplifier 5 by means of electrical terminals disposed at the ends of the rod-like semi-conductor body 1. A resistor 6 is coupled between the output of the amplifier 5 and its inverting input, the resistor 6, together with the resistor 4, determining the gain of the amplifier 5. A voltmeter 7 indicates the magnitude of the voltage at the output of the amplifier 5 which, suitably, has high input impedance.

The above-described apparatus functions in the following manner. The heating winding 3 heats one end of the body 1 such that a temperature gradient, and thereby a temperature difference, occurs between the ends of the body 1. This temperature difference is reduced to varying degrees by the medium flowing through the conduit 2. As a consequence of the temperature gradient, a voltage is generated in the semi-conductor body 1 between its terminals, this voltage being amplified by the amplifier 5 and displayed by the voltmeter 7.

The voltage U generated between the terminals of the semi-conductor body 1 is substantially of the form $U = -K \cdot v^{-a}$, in which K is a constant conditioned by the flowing medium and the configuration of the body, v is the flow rate of the medium and a is a constant determined by the medium (primarily depending upon whether a gas or a liquid is involved).

The advantage inherent in utilizing a semi-conductor body 1 as sensor element resides primarily in the higher level of sensitivity which is attained in comparison with a conventional thermocouple. An increase of sensitivity by a factor of 10 can be attained without difficulty. Moreover, the evaluation circuits connected to the body 1 can be rendered simpler, more reliable and cheaper. The apparatus according to the invention is, therefore, particularly well suited as, for example, a fuel consumption meter for automobiles.

Figure 2:
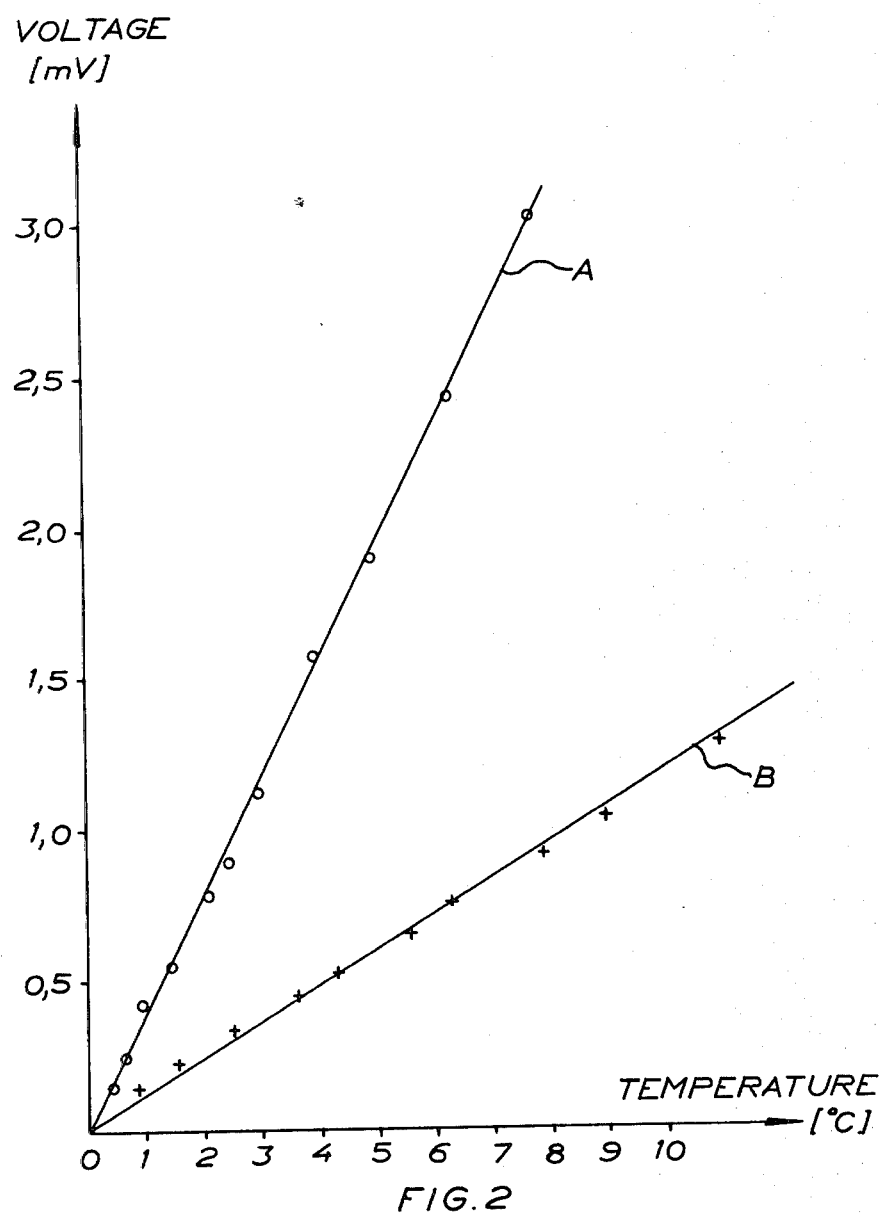
FIG. 2 is a diagram showing the voltage-temperature characteristics of a few semi-conductor materials.

As examples of usable semi-conductor bodies, FIG. 2 shows a first voltage-temperature curve A for an NTC resistor of Philips manufacture, this resistor having a resistance of 4.7 kohm and being manufactured of nickel oxide with an addition of titanium ions, that is to say it is a semi-conductor of the N type. This resistor is in rod configuration having a length of approximately 11 mm and a diameter of approximately 2.8 mm. As the curve illustrates, this resistor has a sensitivity of approximately 0.41 mV/°C. A second example of a semi-conductor body is shown in FIG. 2 with a voltage-temperature curve B, which relates to a PTC resistor of Siemens manufacture, this resistor being of disk configuration having a diameter of approximately 8 mm and a thickness of approximately 2 mm, a resistance of 30 ohm and consisting of barium titanate doped with titanium ions.

The curves shown in FIG. 2 were plotted while utilizing an electric resistance wire as heat source and thermocouples of copper-constantan as temperature detector 3. One and the same amplifier was used for measuring the voltages from the semi-conductor bodies and for measuring the voltages of the thermocouples.

The explanation for the voltage generated in the semi-conductor body 1 as a consequence of the temperature gradient is to be found in the general current transport equation:

$$\bar{j} = \alpha_1 \cdot \bar{E} + \alpha_2 \cdot \bar{V}T$$

in which $\bar{j}$ is the current density vector, $\bar{E}$ is the field force, $\bar{V}T$ is the temperature gradient and $\alpha_1$ and $\alpha_2$ are material constants. Because the number of charge carriers in a semi-conductor is greatly temperature dependent, the constant $\alpha_2$ will not be negligible, for which reason a temperature difference gives rise to a not inconsiderable voltage.

Finally, it might be mentioned that the above-described embodiment may be modified in several respects within the spirit and scope of the invention. Thus, a source of heat other than the heating winding 3 can be utilized, and similarly cooling instead of heating can take place in a portion of the semi-conductor body 1.

Instead of utilizing the output signal of the amplifier 5 as a measurement of the flow rate, the output signal can be used in a manner which is per se known in a servo loop, by means of which the temperature difference across the body 1 is maintained unchanged by control of the current which is supplied to the heating winding 3. In this case, the current will be a measurement of the flow rate in question. As shown in FIG. 1 by means of broken lines, the output of the amplifier 5 can, thus, be connected to the input of a voltage-current converter which supplies the heating winding 3 with current.

I claim:

1. An apparatus for measuring the flow rate of a flowing medium, characterised by a semi-conductor body (1) intended for disposal in the flowing medium and having two electrical terminals, means (3) for establishing a temperature gradient in the semi-conductor body (1) between the terminals, and a voltage amplifier (5), said terminals being coupled to the input of the amplifier.

2. The apparatus as recited in claim 1, characterised in that the semi-conductor body (1) consists of a thermistor.

3. The apparatus as recited in claim 2, characterised in that said means (3) for establishing the temperature gradient consists of a heating winding wound around a portion of the semi-conductor body and connected to a current source.

4. The apparatus as recited in any one of claims 1-3, characterised by a servo loop in which the amplifier (5) is included for maintaining constant the temperature gradient in the semi-conductor body (1).

5. The appartus as recited in claim 4, characterised in that the output of said amplifier (5) is connected to a voltage-current converter which controls said means (3) for establishing a temperature gradient in said semi-conductor body (1).

* * * * *